United States Patent [19]

Buxton

[11] Patent Number: 4,793,286
[45] Date of Patent: Dec. 27, 1988

[54] HOUSING UNIT FOR A DOMESTIC ANIMAL

[76] Inventor: Ronald A. Buxton, 45 Trescobeas Road, Falmouth, Cornwall, England

[21] Appl. No.: 38,963

[22] Filed: Apr. 16, 1987

[51] Int. Cl.[4] .............................................. A01K 1/03
[52] U.S. Cl. ...................................... 119/19; 135/116
[58] Field of Search ............... 119/1, 19; 135/97, 102, 135/106, 116, 118, 119

[56] References Cited

U.S. PATENT DOCUMENTS

| | | | |
|---|---|---|---|
| 1,820,412 | 8/1931 | Warren | 135/116 X |
| 2,311,515 | 2/1943 | Bridge | 135/116 X |
| 2,960,992 | 11/1960 | Klipfel | 135/116 X |

FOREIGN PATENT DOCUMENTS 729030  4/1955  United Kingdom ................. 135/97

OTHER PUBLICATIONS

Hettrick Line Catalog 1963, p. 5. Hettrick Manufacturing Co. Taylorsville Road, Statesville, N.C.

Primary Examiner—Paul J. Hirsch
Attorney, Agent, or Firm—Gifford, Groh, Sheridan, Sprinkle and Dolgorukov

[57] ABSTRACT

A housing unit for a domestic animal comprises a frame for supporting a fabric flexible cover, the frame defining a main housing compartment constituted by tubes joined by connecting elements also define a second chamber or entrance porch. At least the main compartment is provided with a ground sheet which extends under the main chamber and incorporates edge portions defining or connected to upright side walls of a bed base for the animal. A waterproof flexible cover, formed as a unitary layer, is fitted over the frame and has a plurality of tabs by which the cover can be secured to the ground, such as by ground-engaging attachment pegs. A further lining sheet attached under the frame may also be provided.

7 Claims, 4 Drawing Sheets

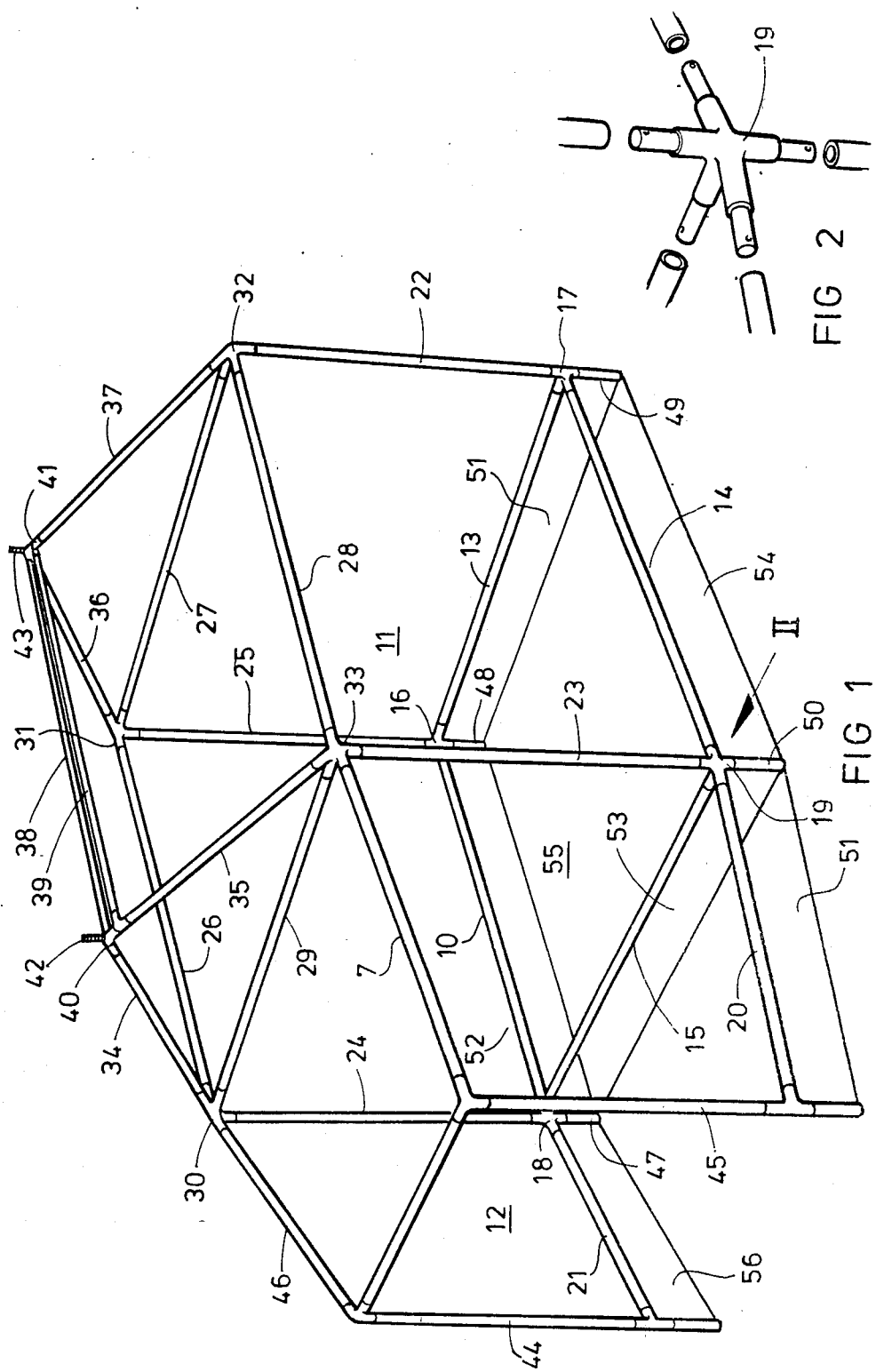

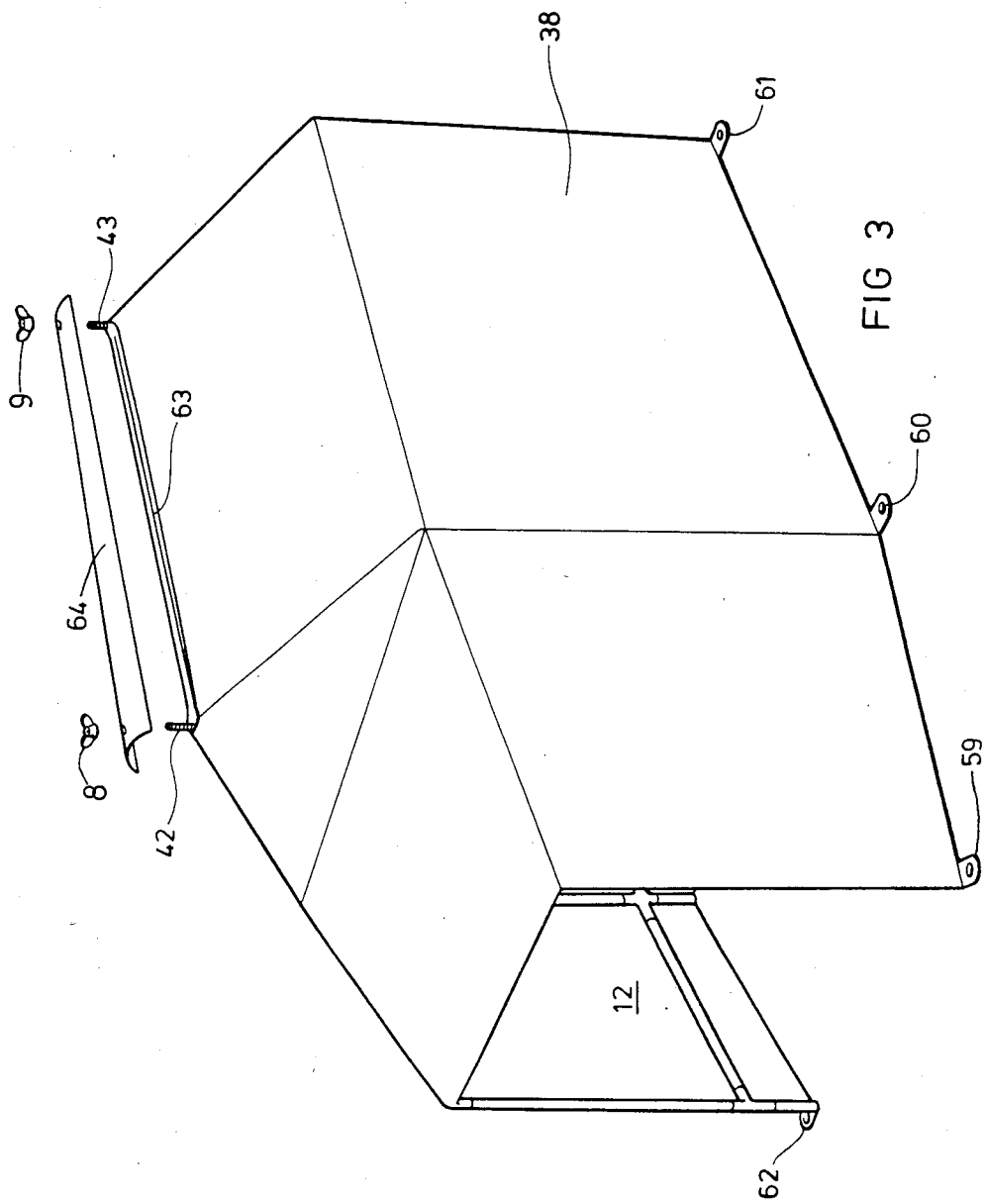

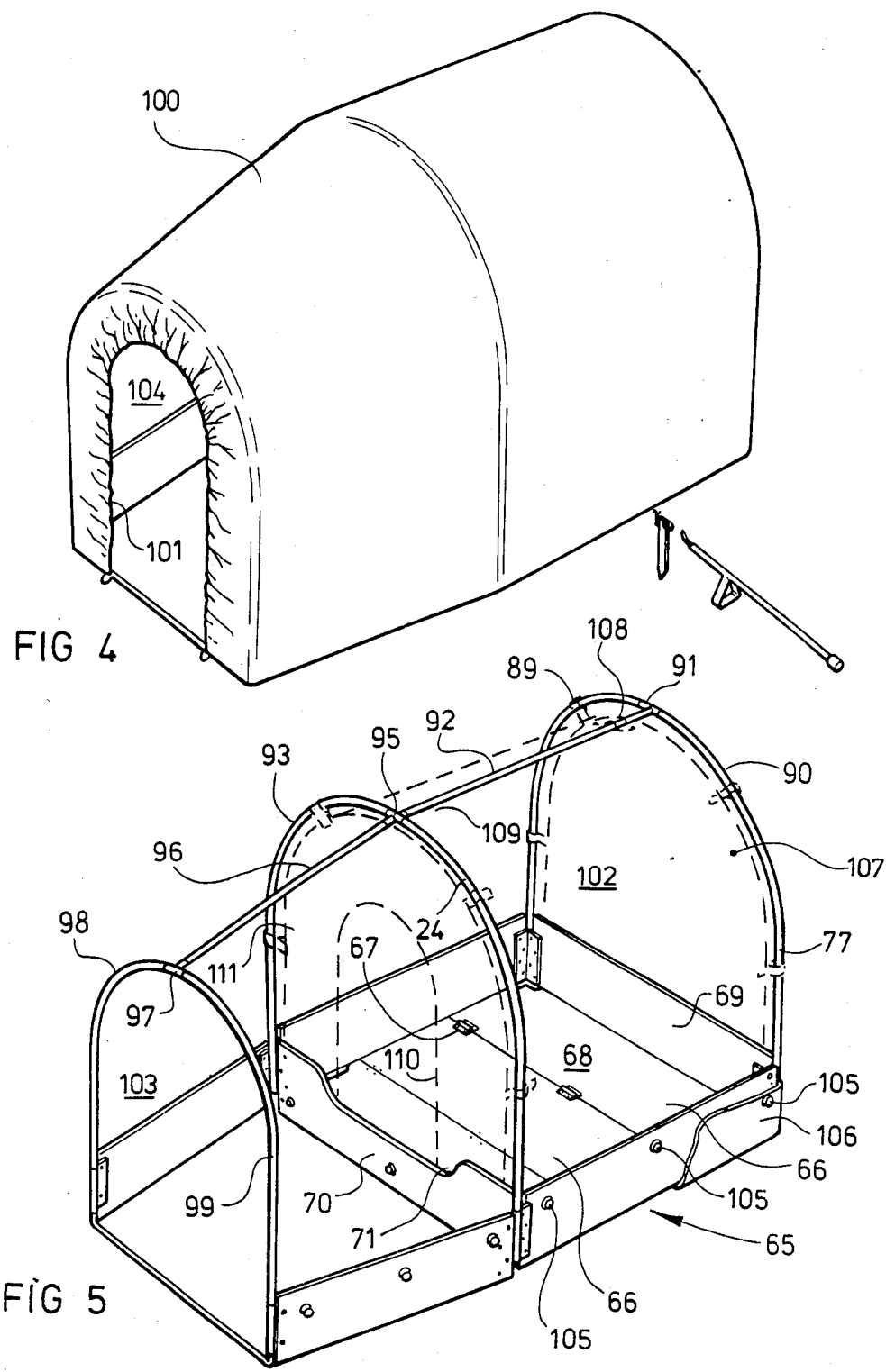

HOUSING UNIT FOR A DOMESTIC ANIMAL

BACKGROUND OF THE INVENTION

Many people enjoy camping vacations and would like to take their domestic pets with them. However, in the confined space of a tent the domestic pet can become a liability, particularly in damp or inclement weather when damp animal fur emits a characteristic and pungent odour. The presence of a damp animal in a tent can also be inconvenient simply from the presence of the excessive moisture.

Although the majority of pet owners would like to take their animals on vacation with them, this is not always possible in view of the accommodation available, and recourse has to be had to boarding kennels which are not entirely satisfactory either from the owners point of view or from the animals point of view even though such establishments are run compassionately; the separation of the pet from its usual environment and the people with whom it is accustomed to live is a traumatic one.

OBJECTS OF THE INVENTION

A primary object of the present invention is to provide collapsable housing accommodation for domestic pets which can be erected quickly and easily and will occupy only a small space.

Another object of the invention is to provide housing which will have the required accommodation available for a pet and which can be collapsed and stored in a small space. A further object of the invention is to provide collapsible housing accommodation for a pet which is easily transportable.

SUMMARY OF THE INVENTION

According to one aspect of the present invention therefore, a housing unit for a domestic animal such as a dog, comprises a frame supporting a cover defining two main housing chambers which are in communication with one another, a first housing chamber having a waterproof ground sheet with sides projecting upwardly therefrom and the second chamber having an opening communicating permanently with the exterior environment.

Such a housing unit may be in the form of a tent with a permanent opening or may be formed from flat sheet panels supported on a suitable framework and secured together in a releasable manner.

By forming the housing unit with the two-chamber configuration the interior chamber can be protected adequately against draughts and rain while having a permanent opening in the second chamber allows the pet to gain access easily without any problems which would result from a closable opening.

The frame is preferably of any known constructional type, for example of tubular frame members joined by suitable connectors, although in other embodiments flat strip joined by bolts or other fixing means may be employed.

In the preferred embodiment of the invention the permanent opening in the second chamber is aligned with the main chamber, that is the opening between the main chamber and the second chamber faces the opening from the second chamber to the exterior, in which case the second chamber acts as an extended "porch" protecting the interior main chamber from the vicissitudes of inclement weather.

Alternatively, however, the opening from the second chamber to the exterior may be inclined with respect to the communicating opening between the second chamber and the main chamber in order further to enhance the protective effect of the second chamber. In particular, the entrance formed by the opening in the second chamber may be at right angles to the communicating opening between the second chamber and the main chamber.

The waterproof groundsheet may be permanently attached to upstanding sides of rigid material which surround the interior main chamber. The sides may also extend around the second chamber, although it is preferred that the groundsheet does not extend into the second chamber, the upright sides provide additional protection against draughts.

The frame members of the supporting frame may be formed in such a way as to be adjustable in size so that once the flexible cover has been positioned over it the frame can be enlarged to ensure that the fabric panels are drawn tight thereby avoiding any flapping which could be disconcerting for an animal occupant.

In another aspect the invention provides a housing unit for a domestic animal comprising a generally rectangular upwardly open box-like base structure, a frame composed of a plurality of individual frame elements having means for attachment to said base structure to be supported thereon, a plurality of frame element interconnection means for interconnecting the ends of said frame elements other than those attached to said base structure whereby to form a frame overlying said base structure, waterproof groundsheet means shaped to fit over the underside of said box-like base structure and extend at least part-way up the walls on the outside thereof, fixing means for fixing an edge of said groundsheet means to the side walls of said base structure, a flexible waterproof cover removably supportable on said frame and defining therewith an interior housing chamber in which said base-structure forms a bed, means defining an opening in said flexible waterproof cover through which access can be gained to said interior chamber defined by said flexible cover and said frame, said opening being a permanently open non-closable entrance for a domestic pet animal.

Various other features and advantages of the present invention will become apparent from a study of the following descriptions of a preferred embodiment, in which reference is made to the accompanying drawings, provided purely by way of non-limitative example.

BRIEF DESCRIPTION OF THE DRAWINGS

FIG. 1 is a perspective view of a frame for supporting a flexible fabric cover of a first embodiment of the invention;

FIG. 2 is a perspective view of a connector element suitable for forming part of the frame of FIG. 1;

FIG. 3 is a perspective view of a housing unit comprising a frame illustrated in FIG. 1 with a flexible cover fitted thereon.

FIG. 4 is a perspective view of a second embodiment of the invention;

FIG. 5 is a perspective view of the embodiment of FIG. 4 with the cover removed.

DESCRIPTION OF THE PREFERRED EMBODIMENT

Figure 6:
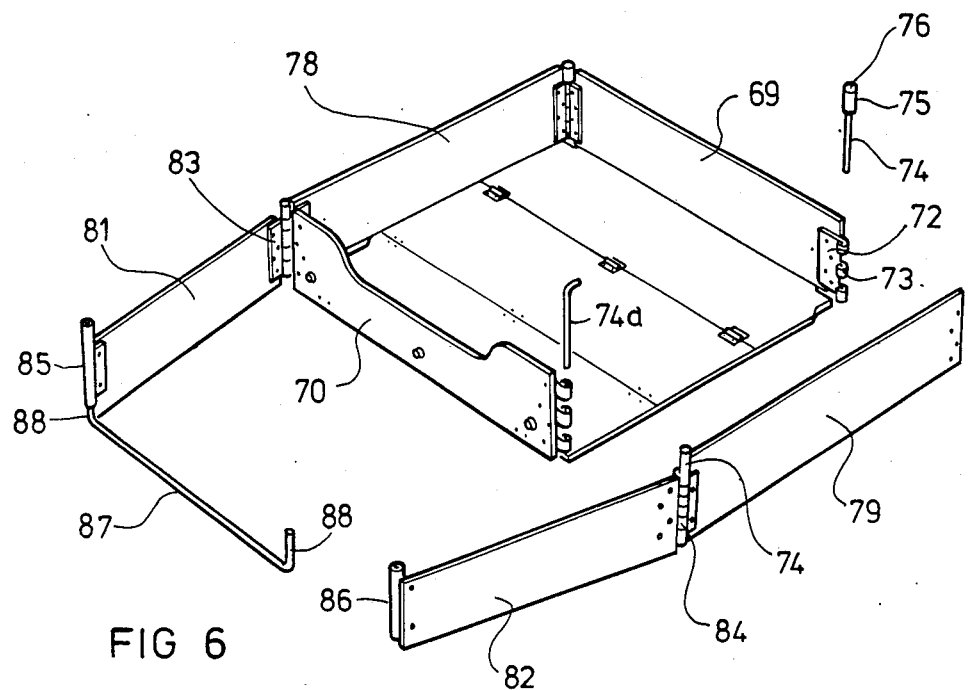
FIG. 6 is a respective view of the base part of the embodiment of FIG. 4 partly dismantled to show the way in which it fits together.

Referring first to FIGS. 1 to 3 of the drawings, a frame for supporting a fabric flexible cover is illustrated in FIG. 1 and comprises a set of straight tubes interlinked by connector elements. The main compartment of the housing unit is indicated with the reference numeral 11 and defined in plan by four straight tubes 10, 13, 14, 15 joined by connector units 16, 17, 18 and 19 the latter two of which also interconnect tubes 20, 21 defining in plan the second chamber 12.

The connectors 16, 17, 18, 19 are shaped, as illustrated in FIG. 2, as a central body with outwardly extending studs for receiving the tubular frame members. Detentes, only schematically shown in FIG. 2, are provided for retaining the tubes in position on the studs. At each corner of the chamber 11 is a upright support frame member 22, 23, 24, 25 and these are joined at their upper ends by horizontal frame members 26, 27, 28, 29 interlinked by a further set of connector elements 30, 31, 32, 33 similar in form to the connector element illustrated in FIG. 2. Triangular gables are defined by two pairs of gable struts 34, 35 and 36, 37 and these are joined at the ridge by two parallel ridge poles 38 and 39 spaced by a small distance to allow ventilation as will be described below.

The ridge poles 38, 39 are joined to the inclined struts 34, 35 and 36, 37 respectively by connector elements 40, 41 from which project screwed studs 42, 43.

The second chamber 12 is defined in plan by the horizontal struts 20, 21 which are joined to vertical struts 44, 45 and inclined struts 46, 47 which meet at the connectors 30, 33 with the frame members defining the main chamber 11.

The horizontal struts 12, 13, 14, 15 are held spaced from the ground by legs 47, 48, 49, 50 and the narrow space between the ground and the straight tubes 10 13, 14, 15 is filled by rigid side walls 51, 52, 53, 54 attached to the horizontal struts 12, 13, 14, 15 by means not shown, such as spring clips. A groundsheet 55 extends under the main chamber 11 and is connected to the upright side walls 51, 52, 53, 54 while side walls 56, 57 extend along the two sides of the second chamber 12 beneath the struts 20, 21 to which they are attached by means not shown, such as spring clips.

A flexible cover 58 is illustrated in FIG. 3. This is formed as a unitary layer which is fitted over the frame illustrated in FIG. 1 and has a plurality of tabs 59, 60, 61, 62 etc., by which the cover can be secured to the ground by ground-engaging tent pegs. A slot 63 is formed in the cover adjacent the space between the two ridge poles 38, 39 to provide ventilation and this is covered loosely by a ridge cover 64 which fits over the upright studs 42, 43 and is held in place by wing nuts 8, 9. The groundsheet 55 does not extend into the second chamber 12 which is separated from the main chamber 11 by the upright wall 53 beneath the straight tube 15 to define a draughtproof enclosure.

Referring now to the embodiment of FIGS. 4, 5 and 6 there is shown a housing unit which incorporates a rigid upwardly open box-like structure 65 which can also serve as a bed for the animal when the housing unit is partly dismantled. In this way the animal becomes familiarized with the bed and when taken on vacation is therefore accustomed to at least part of the housing unit so that it will accept readily the change in surroundings.

The upwardly open box-like structure 65 is composed of a plurality of flat strip like elements 66 joined together edgewise by hinges 67 so arranged that the strips 66 can fold concertina fashion to form a flat pack and can be erected to form a generally flat floor 68 with upstanding end walls 69 and 70 the latter of which has a recess 71 in the upper edge to facilitate passage by an animal.

As can be seen in FIG. 6 the end wall elements 69,70 are provided with separable hinge members 72 formed with a plurality of aligned loops 73 in a spaced array which can be interconnected by means of a pin 74. Each pin 74 has an enlarged head end 75 with a hollow socket 76 to receive the lower end of a hoop like frame element 77. Two further side wall elements 78,79 are provided for linking the end wall elements 69,70, and are provided with cooperating separable hinge elements as described in relation to those fitted to the end wall elements 69,70.

Forwardly projecting further wall portions 81,82 are also provided with hinge elements 83,84 like the hinge elements 72 with which the end wall panels 69,70 are provided. Tubular connectors 85,86 are fitted to the front ends of the forward wall panels 81,82 and can be joined, as seen in FIG. 6, by a wide generally U-shape bent wire connector 87 having upwardly projecting arms 88 which can be introduced into the hollow centres of the tubes 85,86 to hold the wall panels 81,82 in an upstanding orientation converging slightly towards the forward end from their connections at the front wall panel 70.

The hoop members 77 are split into two parts, a left hand part 89 and a right hand part 90, and can be joined by a T-shape connector element 91 to a ridge pole 92. Further split hoop elements 93,94 are joined at the upper ends by a generally cruciform connector 95 which links the ridge pole 92 with a forward ridge pole 96, and a further T-shaped connector 97 links the upper ends of left and right hoop members 98,99. This structure is then covered with a flexible waterproof sheet element 100 which has an elasticated rim 101 to define the entrance into the housing unit defined thereby. As in the previous embodiment the housing element thus comprises a main chamber indicated 102 and a forward or porch chamber indicated 103 in permanent communication and has an opening 104 through which an animal can enter or leave the housing unit without difficulty.

A plurality of press studs 105 are provided on the side wall panels 78,79 and the forward panels 81,82 to link the rim of a groundsheet, only part of which is shown in FIG. 5, to these side walls whereby to keep the base 68 of the upwardly open box-like structure isolated from the dampness of the ground when placed in the open. The groundsheet is indicated with the reference numeral 106 in FIG. 5.

An additional inner lining 107 is suspended from the ridge pole 92 by loops 108, 109 to provide additional insulation for the housing unit. This additional insulating layer 107 is shown in broken outline in FIG. 5 from which it will be seen that the layer may be provided with an elasticated rim 110 which, like the rim 101 of the outer cover 100, pulls the front of the inner lining 107 into the form of a front wall 111 having the opening 110 therein providing additional protection to the interior chamber 102 against draughts.

In use, of course, the animal's usual bedding can be positioned in the box-like structure 65 to overlie the floor 68 so that no discomfort from the parallel strips 66 is experienced by the animal.

Figure 7:
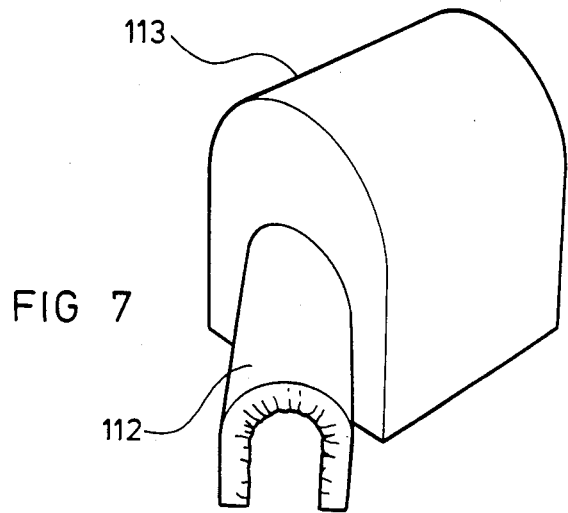

FIG. 7 illustrates a further embodiment of the invention in which the front porch-like structure 112 is inclined at an angle from the main compartment 113, again to provide additional protection against draughts.

I claim:

1. A housing unit for a domestic animal comprising a generally rectangular upwardly open box-like base structure having side walls, upstanding further side members attachable to said side walls of said base structure in forwardly extending side-by-side relation to define an entrance corridor to said housing unit, a frame composed of a plurality of individual frame elements having means for attachment to said base structure to be supported thereon, a plurality of frame element interconnection means for interconnecting the ends of said frame elements other than those attached to said base structure whereby to form a frame overlying said base structure, water proof ground sheet means shaped to fit over the underside of said box-like base structure and extend at least part-way up the walls on the outside thereof, fixing means for fixing an edge of said ground sheet means to the side walls of said base structure, a flexible waterproof cover removably supportable on said frame and defining therewith an interior housing chamber in which said base-structure forms a bed, means defining an opening in said flexible waterproof cover through which access can be gained to said interior chamber defined by said flexible cover and said frame, said opening being a permanently open non-closable entrance for a domestic pet animal, further frame elements attachable to said upstanding further side members to project upwardly therefrom, further frame element attachment means interconnecting said further frame elements together and to said frame elements to form a composite frame including a first frame part defining said interior housing chamber and a second frame part defining an entrance chamber in communication with said interior housing chamber, said flexible cover including a portion extending over said entrance chamber and defining therewith a permanently open entrance for an animal.

2. The housing unit of claim 1, wherein said box-like base structure is collapsible for transport, being composed of a plurality of flat elongate strip-like members joined together in an array along their long edges by hinge means allowing adjacent strip-like members to fold in opposite directions concertina fashion to fold up for transport; the two strip-like members at the opposite ends of the array being connected to the flat elongate strip-like members so as to form an upstanding wall in the erected condition of said base structure, two additional strip-like members defining opposite side walls interconnecting the side walls defined by said two strip-like members at the opposite ends of said array, and means interconnecting the ends of said two additional strip-like members with the ends of said two strip-like members at the opposite ends of said array whereby to define the upwardly open box-like base structure which can be dismantled and collapsed into a flat pack for storage and transport.

3. The housing unit of claim 2, wherein said interconnection means at the ends of said strip-like members and said additional strip-like members include means for receiving said frame elements to form said support frame over said base structure for support of said flexible cover.

4. The housing unit of claim 2, further including a second flexible cover attachable to the inside of said frame within said housing compartment whereby to define an interior lining.

5. The housing unit of claim 2 wherein said frame elements are curved rods connectable together to form hoops of inverted U-shape linked by ridge members.

6. The housing unit of claim 1, further including a second flexible cover attachable to the inside of said frame within said housing compartment whereby to define an interior lining.

7. The housing unit of claim 1, wherein said individual frame elements are curved rods connectable together to form hoops of inverted U-shape linked by ridge members.

* * * * *